United States Patent
Rosendal et al.

(10) Patent No.: US 10,911,443 B2
(45) Date of Patent: Feb. 2, 2021

(54) METHOD AND SYSTEM PROTECTING AGAINST IDENTITY THEFT OR REPLICATION ABUSE

(71) Applicant: SMS Passcode A/S, Brøndby (DK)

(72) Inventors: Claus Rosendal, Allerød (DK); Jakob Østergaard, Vanløse (DK)

(73) Assignee: ENTRUST DATACARD DENMARK A/S, Brøndby (DK)

( * ) Notice: Subject to any disclaimer, the term of this patent is extended or adjusted under 35 U.S.C. 154(b) by 0 days.

(21) Appl. No.: 14/898,322

(22) PCT Filed: Jun. 19, 2014

(86) PCT No.: PCT/EP2014/062938
§ 371 (c)(1),
(2) Date: Dec. 14, 2015

(87) PCT Pub. No.: WO2014/202718
PCT Pub. Date: Dec. 24, 2014

(65) Prior Publication Data
US 2016/0134634 A1     May 12, 2016

(30) Foreign Application Priority Data
Jun. 20, 2013    (EP) .................................. 13173061

(51) Int. Cl.
*H04L 29/06* (2006.01)
*H04W 12/06* (2009.01)

(52) U.S. Cl.
CPC .......... *H04L 63/0853* (2013.01); *H04L 63/08* (2013.01); *H04L 63/10* (2013.01);
(Continued)

(58) Field of Classification Search
CPC ...... H04L 63/10; H04L 63/08; H04L 63/0853
See application file for complete search history.

(56) References Cited

U.S. PATENT DOCUMENTS 7,260,724 B1 *   8/2007   Dickinson ............... H04L 63/08
                                                              713/182
8,312,540 B1 *  11/2012   Kahn ....................  G06F 21/552
                                                              713/183
(Continued)

FOREIGN PATENT DOCUMENTS

WO    WO 2010/052332 A1    5/2010

OTHER PUBLICATIONS

Menezes, et al., "Handbook of Applied Cryptography" CRC Press LLC, 1997, pp. 394-399, XP002713515.
(Continued)

*Primary Examiner* — Vance M Little
(74) *Attorney, Agent, or Firm* — Nixon Peabody LLP

(57) ABSTRACT

A method, implemented by a computer-implemented authentication system, for authenticating a user attempting to access a target component of a computer system, the method comprising: a) receiving, from a first user system via a computer network, user authentication information and a network address identifying the first user system within the computer network; b) obtaining at least one data item of contextual information indicative of a property of an environment of a wireless communications device associated with the user authentication information; c) authenticating the user based on at least the user authentication information; and d) subject to successful authentication, granting access to the target component and storing a data record comprising the received network address and the received contextual information.

16 Claims, 4 Drawing Sheets

(52) U.S. Cl.
CPC ..... *H04L 63/1466* (2013.01); *H04W 12/0605* (2019.01); *H04W 12/0608* (2019.01); *H04W 12/0609* (2019.01)

(56) References Cited

U.S. PATENT DOCUMENTS

| | | | | |
|---|---|---|---|---|
| 8,661,144 B2* | 2/2014 | Schultz | ................. | H04L 63/102 709/227 |
| 8,800,056 B2* | 8/2014 | Chow | ................... | G06F 21/316 705/64 |
| 8,856,892 B2* | 10/2014 | Faludi | ..................... | G06F 21/00 713/159 |
| 8,863,258 B2* | 10/2014 | Goldberg | ................ | G06F 21/31 726/7 |
| 8,973,102 B2* | 3/2015 | Jakobsson | ............... | G06F 21/33 713/155 |
| 9,075,979 B1* | 7/2015 | Queru | ..................... | G06F 21/34 |
| 9,729,930 B2* | 8/2017 | Greenfield | ............ | H04L 63/102 |
| 9,754,255 B1* | 9/2017 | Ma | ......................... | G06Q 20/40 |
| 9,807,226 B2* | 10/2017 | Greenfield | .............. | H04W 4/50 |
| 2002/0073320 A1* | 6/2002 | Rinkevich | ............... | G06F 21/31 713/183 |
| 2003/0204726 A1* | 10/2003 | Kefford | ................... | G06F 21/42 713/171 |
| 2004/0093418 A1* | 5/2004 | Tuomi | .................... | H04L 63/08 709/228 |
| 2005/0071671 A1* | 3/2005 | Karaoguz | ............ | G06Q 20/085 726/26 |
| 2007/0118887 A1* | 5/2007 | Roskind | ................ | G06F 21/316 726/5 |
| 2008/0146193 A1* | 6/2008 | Bentley | ................... | G06F 21/34 455/411 |
| 2009/0055912 A1* | 2/2009 | Choi | ........................ | G06F 21/41 726/6 |
| 2009/0254975 A1* | 10/2009 | Turnbull | ............. | H04L 63/0492 726/3 |
| 2010/0024017 A1* | 1/2010 | Ashfield | ................. | G06F 21/35 726/7 |
| 2010/0199338 A1* | 8/2010 | Craddock | ............... | G06F 21/31 726/7 |
| 2010/0211997 A1* | 8/2010 | McGeehan | ........... | G06F 21/316 726/4 |
| 2011/0145900 A1* | 6/2011 | Chern | ................... | H04L 9/3271 726/7 |
| 2011/0314558 A1* | 12/2011 | Song | ..................... | G06F 21/316 726/28 |
| 2012/0060214 A1* | 3/2012 | Nahari | ................... | G06F 21/316 726/19 |
| 2013/0212387 A1* | 8/2013 | Oberheide | .............. | H04L 63/08 713/168 |
| 2013/0232542 A1* | 9/2013 | Cheng | ..................... | H04L 63/20 726/1 |
| 2014/0003334 A1* | 1/2014 | Hoggan | ................ | H04L 63/107 370/328 |
| 2014/0096215 A1* | 4/2014 | Hessler | ................. | H04W 12/06 726/7 |
| 2014/0189808 A1* | 7/2014 | Mahaffey | .............. | H04L 63/083 726/4 |
| 2014/0214688 A1* | 7/2014 | Weiner | .............. | G06Q 20/3227 705/71 |
| 2014/0289821 A1* | 9/2014 | Wilson | ................... | G06Q 20/42 726/5 |
| 2015/0227727 A1* | 8/2015 | Grigg | ..................... | G06F 21/31 726/4 |
| 2015/0310434 A1* | 10/2015 | Cheung | .................. | G06Q 20/12 705/44 |
| 2016/0269385 A1* | 9/2016 | Siddiqui | ................. | H04L 63/08 |

OTHER PUBLICATIONS

International Search Report for PCT/EP2014/062938 dated Sep. 9, 2014.

* cited by examiner

METHOD AND SYSTEM PROTECTING AGAINST IDENTITY THEFT OR REPLICATION ABUSE

CROSS REFERENCE TO RELATED APPLICATIONS

This application is a U.S. National Phase Application of PCT International Application Number PCT/EP2014/062938, filed on Jun. 19, 2014, designating the United States of America and published in the English language, which is an International Application of and claims the benefit of priority to European Patent Application No. 13173061.6, filed on Jun. 20, 2013. The disclosures of the above-referenced applications are hereby expressly incorporated by reference in their entireties.

TECHNICAL FIELD

The present invention relates to a method and system for computer-implemented user authentication for authorising user-access to a target component of a computer system. In particular, the invention relates to such a method and system that prevents—or at least reduces the risk of—identity theft and/or man-in-the-middle attacks.

BACKGROUND

In the context of multi-user computers, authentication procedures are widely used to give a user access to the programs and system resources to which the user has been granted access.

In the context of the present document, the term target component of a computer system is intended to refer to any entity of a computer system to which user-access may be granted based on an authentication scheme. Examples of such target components include a computer or group of computers, a computer network, a communications network, one or more computer programs executed on a data processing system, functionality of one or more computer programs, computer resources, such as drivers, memory, computer peripherals, data stored in a memory, services provided by a computer, etc. In the following, the process of requesting and granting access will also generally be referred to as login.

Traditional means of granting access make use of a user identification and a password. With the arrival of wide area networks and the internet, millions of computer programs and systems are now security-wise solely based on giving personalized access using a user identification and password. In recent years, methods and programs to acquire a user's identity in the form of user identification and password have exploded in usage resulting in users being defrauded daily.

Sophisticated methods of stealing a user's identification and password involve so-called phishing, where a third party gains access to a user's ID and password by criminal means. These methods may even involve more sophisticated attacks such as man-in-the-middle attacks, where a fraudulent third party intercepts the communication between the user and a network, computer system or program when the user logs into said network, computer system or program. Once intercepted, the fraudulent third party either establishes a parallel process and logs into the same network, computer system or program or simply acts as a middle-man and passes the user actions on to the said network, computer system or network for identity theft purposes.

One method for securing users against such attacks is to ensure that a second means of authentication is deployed in addition to the user identification and password. Such second means are also referred to as a second factor of authentication. The early generations of these solutions used a hardware device called a token that the user would carry with him/her everywhere; other implementations utilise soft-tokens or sms-delivered token codes. The above prior art methods typically use a pre-issued passcode that is valid for a period of time or until used. These concepts have not been entirely satisfactory for preventing both phishing and, in particular, man-in-the-middle attacks as the user never knows whether a fraudulent third party has been present and intercepted the session.

US 2008/0189776 discloses an authentication system which authenticates a requester requesting access to a network from a device based on location information of the requester and of the device. While adding an additional level of security to an authentication system, this prior art method relies on predetermined policy decisions which may be difficult to define or implement, especially in systems comprising a large number of users with varying user behaviour and who may log in from a large number of locations and using a large variety of user systems. Furthermore, this prior art system typically requires software to be executed by, or a similar modification of, the device from which access is requested so as to obtain location information from said device.

SUMMARY

Disclosed herein are embodiments of a method, implemented by a computer-implemented authentication system, for authenticating a user attempting to access a target component of a computer system, the method comprising:
a) receiving, from a first user system via a computer network, user authentication information and a network address identifying the first user system within the computer network;
b) obtaining at least one data item of contextual information indicative of a property of an environment of a wireless communications device associated with the user authentication information;
c) authenticating the user based on at least the user authentication information; and
d) subject to successful authentication, granting access to the target component and maintaining a data record indicative of a security context comprising the received network address and the received contextual information;
wherein the method further comprises determining, based on one or more selection criteria, at least one recurrent security context from a plurality of stored data records, each indicative of a stored security context comprising one or more network addresses of a user system and received contextual information associated with said one or more network addresses, and each stored security context having associated with it data about one or more previous occurrences; and using the determined recurrent security context in a subsequent decision whether to grant a subsequent request by said user to access the target component.

Hence, some embodiments of the method collect the network addresses of one or more user systems from which a user has successfully requested access to a target component. For each successful attempt, the method further collects contextual information about an environment of a wireless communications device associated with the user. After repeated successful access attempts from recurring network addresses, and with a given recurring set of contextual information, the system records a security context as a trusted security context. The trusted security context comprises one or more recurring network addresses and the recurring contextual information which have repeatedly been associated with successful access attempts.

The recorded trusted security contexts are then used when evaluating subsequent access requests by the user. For example, if the user subsequently requests access from a user system and with the recorded contextual information of a trusted security context, the authentication system only grants such access, if the request is made from a corresponding network address that has been recorded as being included in the trusted security context associated with the contextual information. Otherwise the authentication system may deny access or at least require additional authentication procedures or information.

Consequently, in some embodiments, the authentication system detects patterns in the access behaviour of users and, if a user attempts to access the target component within a context that has repeatedly been associated with a set of network addresses, the system denies access, if the attempt is made from a network address outside the set. The recurrent set of network addresses and contextual information may thus be regarded as trusted network addresses in trusted environments. Attempts from a trusted environment but involving an unknown network address are blocked, as this attempt may involve a man-in-the middle or an otherwise fraudulent user using an unknown user system.

It is an advantage that embodiments of the method disclosed herein do not require any special software to be executed by the user system. The login dialog may e.g. be implemented via a conventional browser window or other conventional login application. Even if, in some embodiments, it may be desirable to modify the user system so as to be able to perform other functions, such as other functions related to the access process or related to the functions of the target component, such modifications may be kept at a minimum, thereby reducing the need for maintaining and updating software applications on many different devices.

The user authentication information may comprise any suitable form of user credentials and/or data derived from such credentials. In particular, the user credentials may comprise a username or similar user identification and additional information such as a password, biometric information, etc. A password typically comprises a sequence of letters, digits and/or other characters. Some or all of the user authentication information may be entered by the user via a user-interface of the first or second user system, respectively.

The contextual information may be chosen from a plurality of data items indicative of the geographic environment, the communications network environment, or a data item otherwise indicative of the environment in which the user requests access. The environment is determined as the environment of a wireless communications device carried by the user. The contextual information may be indicative of the geographical environment and/or the network environment. For example, the contextual information may include data indicative of a current geographic/physical location of the wireless communications device. Alternatively or additionally, the contextual information may comprise data indicative of a location of the wireless communication within a network, e.g. its location relative to a network topology.

For example, the contextual information may comprise a service set identifier (SSID) or other suitable identifier of a wireless local network to which the wireless communications device is connected, one or more service set identifiers or other suitable identifiers of one or more wireless local networks detected by the wireless communications device within a proximity of the wireless communications device, a network address (e.g. an IP address) of a node (e.g. a wireless access point or a default gateway) of a network to which the wireless communications device is connected, geographical coordinates of a current position of the wireless communications device; a public internet protocol (IP) address of the wireless communications device, etc., or combinations thereof or data derivable from such information, such as country or organization information derivable from an IP address. Further examples of contextual information include data identifying cellular network antennas within a proximity of the wireless communications device and/or other data obtainable from a cellular network system. It will be appreciated that a set of contextual information may comprise one or multiple data items of contextual information, e.g. a single network identifier, multiple network identifiers, one or more network identifiers and geographic location, and or other combinations of items of contextual information.

When the contextual information comprises on or more data items that are automatically collectable by the wireless communications device, the method may efficiently be performed with only limited user-interaction. In particular, the collection of contextual information may, in some embodiments, be performed without the need for user interaction.

In some embodiments, obtaining at least one data item of contextual information comprises causing the wireless communications device to execute a software application configured to cause the wireless communications device to collect the contextual information and to forward the collected contextual information to the computer-implemented authentication system. The software application may be executed automatically without involvement of the user; alternatively, execution of the software application by the wireless communications device may be triggered by a user action, e.g. by selecting a link embedded in a message received by the wireless communications device from the authentication system. Activation of the link causes execution of the program (e.g. an app).

In an alternative embodiment, obtaining at least one data item of contextual information comprises obtaining, from a software application executed on a server computer configured to provide a service to wireless communications devices, a network address from which the wireless communications device has previously accessed said server computer to obtain said service. In some embodiments, the method may only utilise network addresses related to a recent previous access, e.g. the most recent previous access. Moreover, the method may use a time threshold to determine whether a previous access is to be considered recent and thus to be used as an indicator of a current context. For example, many wireless communications devices periodically access a web service, e.g. a mail server, so as to receive updated information, to synchronise information and/or the like. The server providing such a web service receives user authentication data and a network address, e.g. a public IP address, of the wireless communications device. Optionally, the server may receive additional data such as information about the operating system of the wireless communications device, a device ID, cookie data and/or the like. Consequently, the server may log the network addresses and, optionally, additional data of a wireless communications device associated with a given user, thus allowing an authentication system to retrieve these data and to use them as contextual information without the need for additional software applications executed by the wireless communications device. Consequently, the method may be implemented across many mobile device platforms and without imposing unnecessary requirements on the wireless communications device.

In some embodiments, the method further utilises a message-based user authentication, e.g. based on a Short Message System (SMS or Text Messaging) in cellular phone networks to send a passcode to the user's wireless communications device. Instead of sending the passcode directly, the method may comprise sending challenge data to the wireless communications device, causing the wireless communications device to compute a passcode, e.g. based on the challenge data and a secret key stored by the wireless communications device. In any event, the wireless communications device may then display the passcode so as to allow the user to enter the passcode into the user system from which access is requested. Consequently, such message-based user authentication may conveniently be combined with the collection of contextual information and provide as a second authentication factor an increased security.

Accordingly, in some embodiments, authenticating the user comprises:
sending, via a communications network, challenge data to said wireless communications device;
receiving, via the computer network, a passcode, e.g. a one-time passcode, from the first or second user system, respectively;
verifying the received passcode.

It is an advantage of this and other embodiments, that it reduces the risk of phishing, man-in-the-middle, and similar methods for compromising credentials. The passcode may be entered by the user via a user interface of the first or second user system, respectively or otherwise be transferred by the user (or automatically) from the wireless communications device to the first or second user system, respectively. In some embodiments, the above or other second factors of authentication are used only if the access request has not been performed from a trusted security context, i.e. not from a trusted network address with the associated trusted contextual information.

The passcode may be a real-time session-specific one-time passcode, i.e. a passcode that is generated in real-time during the login session with which it is associated, i.e. the session for which the passcode is session specific. Hence, in some embodiments, the passcode is not pre-generated or otherwise in existence before the corresponding login session is initiated. When the wireless communications device computes the passcode from at least the challenge data and a secret key of the wireless communications device the risk of attacks based on fraud apps that could auto-forward SMS messages or push texts to a hacker is reduced.

When the passcode is session-specific it is associated with a single specific login session; preferably the passcode is unique for that session. Furthermore, when the passcode is a one-time passcode it is only valid for a single login. The challenge data may be any suitable data, e.g. a random number, a data item derived from the user authentication information, from a current time, from a session identifier, or from other suitable data, or a combination thereof.

In some embodiments, sending the challenge data may cause the wireless communications device to collect and send the contextual information. For example, this could be handled automatically by the device or as described above, the message may comprise a link to a software application to be executed on the wireless communications device. Upon activation of the link by the user, the software application may be executed with the received challenge data as an input. The application may then compute and display the passcode and collect the contextual information and forward it, e.g. via a return message, to the authentication system. The return message may be sent automatically; it may be an SMS, a return message through mobile data or a wireless LAN or another suitable message type or communications channel. In some embodiments, the method further comprises causing the first or second user system, respectively, to prompt the user to enter the passcode.

Once the user has entered the passcode into the first or second user system from which access is requested, the first or second user system, respectively, forwards the passcode to the authentication system which may verify the received passcode, e.g.—in embodiments where the passcode was not sent directly—using challenge data and a digital key stored by the computer-implemented authentication system and associated with the wireless communications device. The secret key of the wireless communications device and the digital key may be a shared secret key known to the wireless communications device and the authentication system; alternatively, they may be a private-public key pair of an asymmetric key system.

A determined recurrent security context may be used in a subsequent decision whether to grant a subsequent request by a user to access the target component in a number of ways. In particular, the determined recurrent security context may be used to establish additional conditions to be fulfilled for a subsequent request to be granted and/or to selectively require additional user authentication for a request to be granted.

In some embodiments, using the determined recurrent security context in a subsequent request by said user to access the target component comprises
a) receiving, from a second user system via a computer network, user authentication information and a network address identifying the second user system within the computer network;
b) obtaining at least one data item of contextual information indicative of a property of an environment of a wireless communications device associated with the user authentication information;
c) authenticating the user based on at least the user authentication information; and, subject to successful authentication of the user,
d) if the obtained contextual information matches contextual information of the determined recurrent security context, granting access to the target component without further authentication only if the received network address matches a network address of said determined recurrent security context. Otherwise the authentication system may deny access or at least require additional authentication procedures or information In some embodiments, if the received network address matches a network address of said determined recurrent security context, the method further comprises granting access to the target component without further authentication only if the obtained contextual information matches the contextual information of said recurrent security context. Hence, once a recurrent security context comprising one or more network addresses and associated contextual information is recorded by the authentication system as a trusted security context, if access is subsequently requested from either a network address matching one of the recorded recurring network addresses or with contextual information matching the recorded recurring contextual information, the request is only granted, if the request is made both from a network address matching one of the recorded recurring network addresses and with the recorded recurring contextual information of said recurrent security context. Otherwise the authentication system may deny access or at least require additional authentication procedures or information.

For the purpose of the present description, a security context refers to a data item that comprises one or more network addresses of respective user systems and one or more items of contextual information associated with the network addresses. A security context may thus be regarded as an association between one or more network addresses and one or more items of contextual information. An occurrence of a security context refers to a successful login attempt having been made with said security context. In some embodiments, a security context comprises a pair of a network address and associated contextual information. In some embodiments, a security context comprises a single such pair. It will be appreciated that, in addition to the one or more network addresses and associated contextual information, a security context may comprise or be stored in association with additional information, including but not limited to information about previous occurrences of the security context, e.g. information identifying one or more users and/or user groups that have successfully requested access within the security context, i.e. one of the network addresses and with one or more of the associated contextual information. Additionally or alternatively, a security context may comprise history information about the times when access has been successfully granted within the security context. Hence, data about one or more previous occurrences may comprise data indicative of the number of previous successful login attempts and/or additional details about the successful login attempts, such as data indicative of when a successful login attempt has been made, information about the user having successfully attempted a login, and/or the like.

The maintained data records indicative of security contexts and the determined recurrent security contexts may be stored by the authentication system in a database or any other suitable storage medium.

The security contexts may be stored in association with the corresponding user authentication information, so as to allow the authentication system to retrieve all recorded and/or recurrent security contexts that are associated with a given user. Hence, in some embodiments each security context is stored as a data record comprising user information, a set of network addresses, and a corresponding set of contextual information. The security context may be stored associated with individual users or with user groups, e.g. users of a certain organisation, a certain access right, and/or the like. Alternatively, security contexts may be stored globally, i.e. without reference to individual users or user groups.

Hence, maintaining data records indicative of security contexts may comprise storing a new data record or updating an existing data record, e.g. with data indicative of a new occurrence of a previously recorded security context. The stored data record may be associated with data about one or more occurrences in a variety of ways. For example, for each new occurrence a new copy of the record may be appended to a list of records. Alternatively, each record may comprise a history log indicative of the number of occurrences and/or the dates and times of each occurrence and/or other data indicative of each of the occurrences. The number of occurrences may be one occurrence or multiple occurrences.

In some embodiments, the determination as to whether two sets of contextual information match each other may require the two sets to be exactly equal. In other embodiments, the determination that two sets of contextual information match may merely require the two sets to have at least a predetermined degree of similarity according to a suitable measure of similarity, e.g. a suitable distance measure.

Similarly, in some embodiments, the determination as to whether a network address matches the one or more network addresses of a security context may require the network address to be exactly equal to one of the one or more network addresses of the security context. In other embodiments, the determination may merely require the network address to have at least a predetermined degree of similarity with one of the one or more network addresses of the security context, e.g. according to a suitable measure of similarity. For example, in some embodiments, two network addresses may be determined to match each other if they are within the same subnet. Alternatively or additionally, two network addresses may be determined to match each other if they are owned by the same organization.

A recurrent security context refers to a security context that has been identified by the process as having occurred a number of times, i.e. that a number of successful login attempts have been made from network addresses and associated contextual information matching said security context. The determination as to whether a security context is recurring may be based on a number of suitable selection criteria. For example, the determination as to whether a security context is recurring may require at least one network address (or, in some embodiments, at least a matching network address) of the security context to occur at least a predetermined number of times together with respective sets of contextual information that all match each other. In some embodiments, the determination may require a predetermined number of occurrences within a predetermined time window e.g. since a predetermined number of days from the current point in time. It will be appreciated that alternative or additional selection criteria may be used. A determined recurrent security context will also be referred to as a trusted security context.

In some embodiments, if access is not granted due to a mismatch of network address and contextual information, access may simply be denied. In other embodiments access may still be granted subject to a suitable additional user authentication process.

The features of embodiments of the methods described herein may be implemented in software and carried out on a data processing system caused by the execution of computer-executable instructions. The instructions may be program code means loaded in a memory, such as a Random Access Memory (RAM), from a storage medium or from another computer via a computer network. Alternatively, the described features may be implemented by hardwired circuitry instead of software or in combination with software.

Disclosed herein are different aspects including the method described above and in the following, corresponding methods, apparatus, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

According to one aspect, disclosed herein is a data processing system configured to perform the steps of an embodiment of the method described herein. According to another aspect, disclosed herein is a computer program product comprising computer program code adapted to cause a data processing system to perform the steps of an embodiment of the method disclosed herein when said computer program code is executed on said data processing system. Hence, the computer-implemented authentication system may be implemented as such a specifically configured data processing system, e.g. a data processing system having stored thereon such a suitably configured computer program. The data processing system may be a suitably programmed computer, e.g. a server computer, or it may comprise multiple suitably programmed computers, e.g. computers interconnected in a computer network.

Each of the first and second user system may be a computer such as a desktop computer, a tablet, portable or handheld computer or any other processing device connectable to a computer network, e.g. a personal digital assistant, communicator, telephone, network terminal, etc. In some embodiments the first and second user system may be the same user system. In some embodiments, the user interfaces of the user system used for entry of the user authentication information and the passcode, respectively, may be the same user interface. When the above user interfaces are different from each other, e.g. different windows presented to the user (e.g. by the same or different software programs), different physical interfaces such as different displays, different message gateway such as an instant message system etc., the security of the system is further improved.

According to yet another aspect, disclosed herein are embodiments of a method, implemented by a wireless communications device, for facilitating authentication of a user attempting to access a target component of a computer system, the method comprising:

receiving, from an authentication system, a request to collect contextual information indicative of at least one property of an environment of the wireless communications device;

obtaining at least one data item of contextual information and sending the obtained contextual information to the authentication system.

The request may be received in a variety of forms, e.g. as a message comprising a link which, when activated by a user of the wireless communications device, causes a program to be executed by the wireless communications device that collects contextual information. Alternatively or additionally, the request may require another form of user activation. Yet alternatively, upon receipt of the request, the wireless communications device may automatically initiate the collection of the contextual information without the need for user a user action.

According to yet another aspect, disclosed herein are embodiments of a wireless communications device adapted to perform steps of the method disclosed herein. The wireless communications device may be any suitable user equipment (UE) such as a mobile phone, a smart phone, a tablet computer, a handheld computer, or another suitable communications device. The user system and the wireless communications device may be different devices. The wireless communications device may be suitably programmed by means of a software program, such as an app, stored on and executable by the wireless communications device.

The communications network may be a wireless communications network, such as a cellular communications network. Generally, the communications network may be a network suitable for communicating real-time messages, e.g. a short text message system, an instant messaging system, or the like. For example, the communications network may be or comprise a telecommunications network such as a cellular communications network, e.g. based on a GSM, GPRS, EDGE, UTMS, HSDPA, WIMAX standard or any other suitable network.

The computer network may be any suitable network allowing computers to communicate with each other, e.g. a local area network (LAN), a wireless local area network (WLAN), a wide area network (WAN), an internet, a telecommunications network such as a cellular communications network, e.g. based on a GSM, GPRS, EDGE, UTMS, HSDPA, WIMAX standard or any other suitable network. In some embodiments, the computer network is adapted to allow computers to communicate with each other via an Internet Protocol (IP). Consequently, the network address may be any suitable type of address or identifier suitable for determining the sending and/or receiving device of a message via the computer network. Examples of suitable network addresses are IP addresses, such as public IP address The communications network and the computer network may be different networks, the same network, or they may partly use the same and partly different networks.

BRIEF DESCRIPTION OF THE DRAWINGS

The above and/or additional objects, features and advantages of embodiments of the methods, systems and devices disclosed herein, will be further elucidated by the following illustrative and non-limiting detailed description of embodiments of the methods, systems and devices disclosed herein, with reference to the appended drawings, wherein.

DETAILED DESCRIPTION

In the following description, reference is made to the accompanying figures, which show by way of illustration how embodiments of the methods, systems and devices disclosed herein may be practiced.

Figure 1:
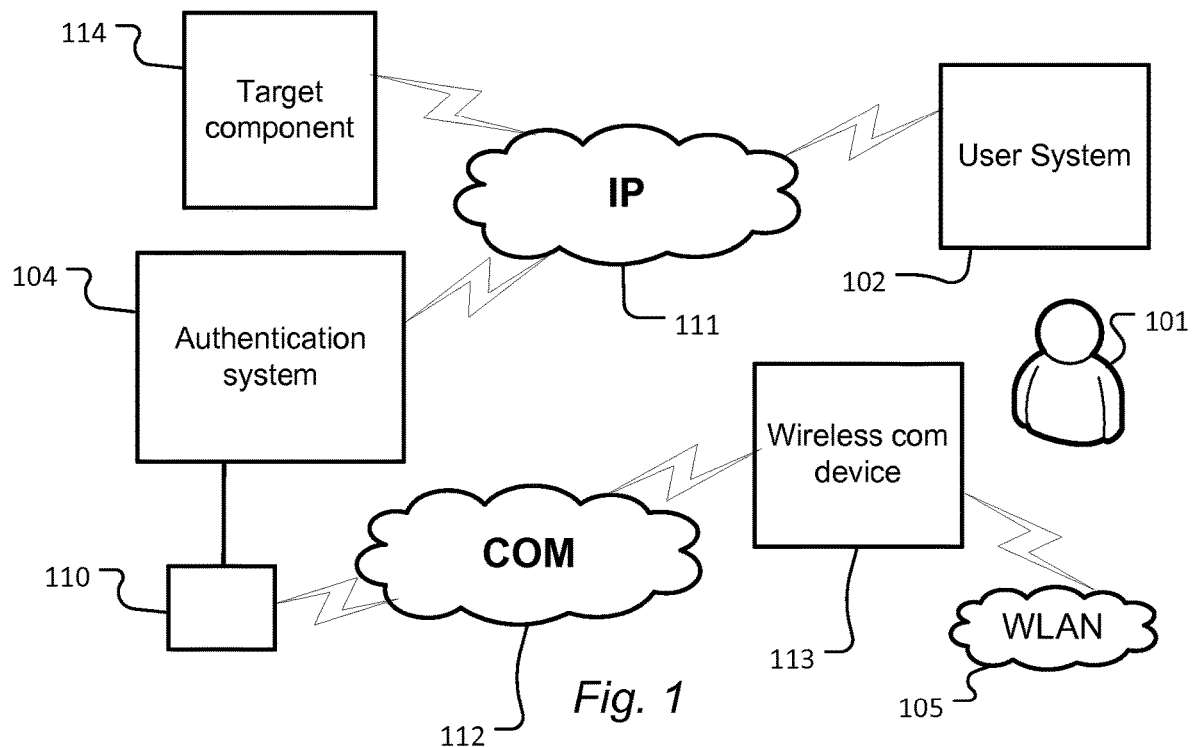
FIG. 1 schematically illustrates an example of a computer system comprising an example of an authentication system disclosed herein.

FIG. 1 schematically illustrates an example of a computer system comprising an example of an authentication system disclosed herein. The system comprises a computer-implemented authentication system 104 for providing an intended authorised user 101 access to a target component 114 of a computer system while preventing access by unauthorized users. The target component 114 may be a computer program, a computer or other data processing system, a computer network, or any other computer-accessible entity requiring authentication.

The system further comprises a user system, e.g. a computer, a network terminal, or another processing device allowing a user to request access to the target component 114 and to enter the user's username and password (or other user authentication information) and, optionally, a one-time passcode described herein. To this end, the user system 102 comprises a suitable network interface for connecting the user system to the user authentication system via a computer network 111. The user system 102 further comprises a suitable user interface such as a keyboard and a display or another device for entering user authentication data, such as biometric input device or the like.

The computer network 111 may be any suitable communications network allowing data communication between computers and/or other processing devices. For example, the computer network may be a local area network (LAN), a wireless local area network (WLAN), a wide area network (WAN), an internet, a telecommunications network such as a cellular communications network, e.g. based on a GSM, GPRS, EDGE, UTMS, HSDPA, WIMAX standard or any other suitable network or combination of the above.

The system further comprises a wireless communications device 113, e.g. a mobile phone or a smart phone, carried by the user 101 who wishes to be granted access to the target component 114. The wireless communications device 113 is connectable to a cellular telecommunications network 112 or another suitable communications network. The wireless communications device 113 is further connectable to a wireless local area network 105. In alternative embodiments, the wireless communications device may be connectable to one type of network only, e.g. only a wireless local area network or only to a telecommunications network. In yet alternative embodiments, the wireless communications device may be connectable to more than two networks.

Figure 2:
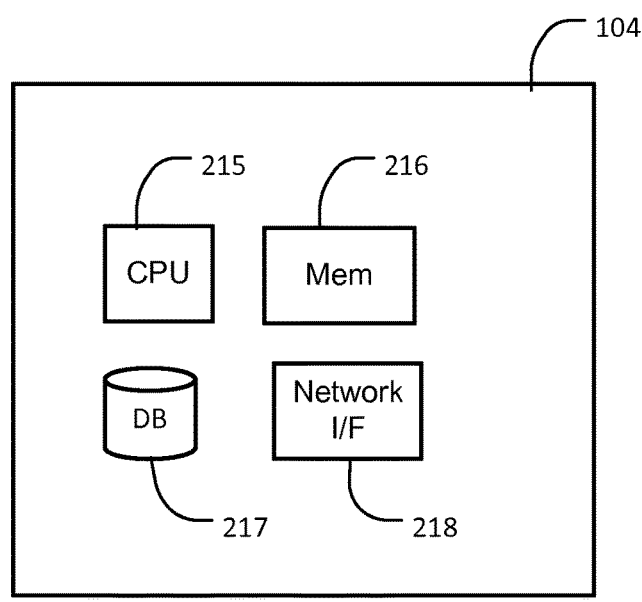
FIG. 2 schematically illustrates an example of an authentication system.

FIG. 2 shows a schematic block diagram of an example of an authentication system 104. The computer-implemented authentication system 104 may be a suitably programmed data processing system executing a suitable authentication program such as a server login screen program, a network access login program or similar. To this end, the authentication system 104 comprises a processing unit 215, a memory 216, a database 217, and a suitable network interface 218 for connecting the authentication system to the communications network 111. The memory 216, the database 217 and the network interface 218 are communicatively connected to the processing unit 215. The processing unit 215 may be a microprocessor, CPU (Central Processing Unit), or other suitable processor. The memory 216 may be any suitable volatile or non-volatile memory or other data storage device. The memory 216 may have computer program code stored thereon, adapted to cause the processing unit to perform embodiments of the authentication process described herein, e.g. the steps described with reference to FIGS. 4 and 6 below. The network interface 218 may comprise any suitable circuitry adapted to provide a network connection to the computer network.

The authentication system 104 is adapted, e.g. by means of a computer program stored in the memory 216 and executable by the processing unit 215, to execute one or more authentication functions, e.g. an application login or network login application such as a web site login system, optionally with an added two-factor authentication functionality based on a real-time session-specific One-Time-Passcode which may be sent via SMS or another suitable channel. The authentication system 104 is further adapted to receive contextual information from a wireless communications device, to record security contexts comprising one or more network addresses and associated contextual information, to detect recurring security contexts, and to verify subsequent network addresses and contextual information against previously detected recurring security contexts. An example of process steps performed by the authentication system will be described in greater detail below.

Again referring to FIG. 1 with continued reference to FIG. 2, the authentication system 104 is further connected, e.g. via network interface 218, to a message gateway system 110 such as an SMS message gateway. The message gateway system is connected to the cellular telecommunications network 112 so as to allow the authentication system 104 to send a message via said message gateway 110 and said communications network 112 to the wireless communications device 113, and to receive collected contextual information from said wireless communications device 113. Alternatively or additionally, the authentication system 104 may be configured to send messages to the wireless communications device via a computer network connected to the wireless local area network 105. For example, the wireless local area network 105 may be connected to the communications network 111.

Figure 3:
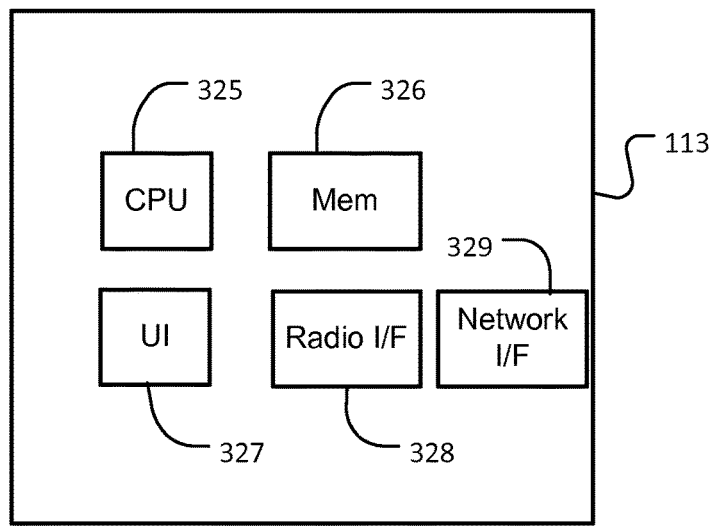
FIG. 3 schematically illustrates an example of a wireless communications device.

FIG. 3 shows a schematic block diagram of an example of a wireless communication device, such as a mobile telephone, a smart phone, a portable computer, or the like. The wireless communications device 113 comprises a processing unit 325, a memory 326, a user interface 327, a radio interface 328 for communicating via a cellular telecommunications network, and a suitable network interface 329 for connecting to a wireless local area network. The processing unit 325 may be a microprocessor, CPU, or other suitable processor. The memory 326 may be any suitable volatile or non-volatile memory or other data storage device. The user interface 327 may comprise a display and a keyboard or keypad, touch screen, and/or the like and/or another suitable interface allowing a user to enter information and to be presented with a one-time passcode. It will be appreciated that the wireless communications device may comprise other circuitry or devices for determining contextual information, e.g. a GPS circuit or other circuitry or sensor for determining a physical location of the wireless communications device. It will further be appreciated that other embodiments of a wireless communications device may only have an interface to a single communications network, e.g. a cellular network or a local communications network. In yet other embodiments, the wireless communications device may comprise one or more interfaces to additional or alternative networks.

Again referring to FIG. 1 and with continued reference to FIG. 3, the wireless communications device 113 has stored thereon, e.g. in memory 326, a computer program which, when executed by the processing unit 325, causes the wireless communications device to collect contextual information as described herein, and to forward the collected information to the authentication system 104, e.g. via communications network 112 or via network 105. For example, the wireless communications network may be adapted to forward a suitable identifier (e.g. an SSID) of the wireless local area network 105 as contextual information. Alternatively or additionally, the wireless communications network may be adapted to collect other types of contextual information indicative of an environment of the wireless communications device. To this end, the wireless communications device may comprise a GPS device or another positioning system allowing the wireless communications device to determine its current geographic location. Yet alternatively or additionally, the wireless communications device may comprise other sensors, devices or functions for detecting a property of its environment, e.g. a network address of a network access point to which the network interface 329 is connected, and/or the like.

The user authentication system 104 may provide the functionality of a 2-factor authentication system based on SMS, e.g. as described in published international patent application WO 2010/052332, the entire contents of which are hereby incorporated herein by reference. In particular, the authentication system may generate a unique one-time passcode for each specific login session only valid for that particular login session. To this end the passcode may be generated from information about that session, e.g. a session identifier, or from varying information such as a random number. The authentication is thus based on two factors: a first factor, usually a username and password to be validated by the authentication system 104, and the one-time passcode as a second factor.

Besides providing two-factor user authentication, the authentication system 104 also receives and stores contextual information in database 217 that is received from wireless communications devices in connection with successful access attempts. The collection and use of the contextual information during subsequent authentication processes will be described in greater detail below.

It will be appreciated that the authentication system 104 may be implemented by a single computer or by multiple computers. For example, the generation and verification of one-time passcodes, the collection, evaluation, and subsequent verification of contextual information, and the verification of the original user authentication information may each be performed by respective computers; alternatively, some or all of these processes may be implemented by the same computer. In particular, the validation of the user authentication information such as username and password may be performed by a Microsoft Active Directory server, or a system holding information regarding username and password in an application like home banking.

Figure 4:
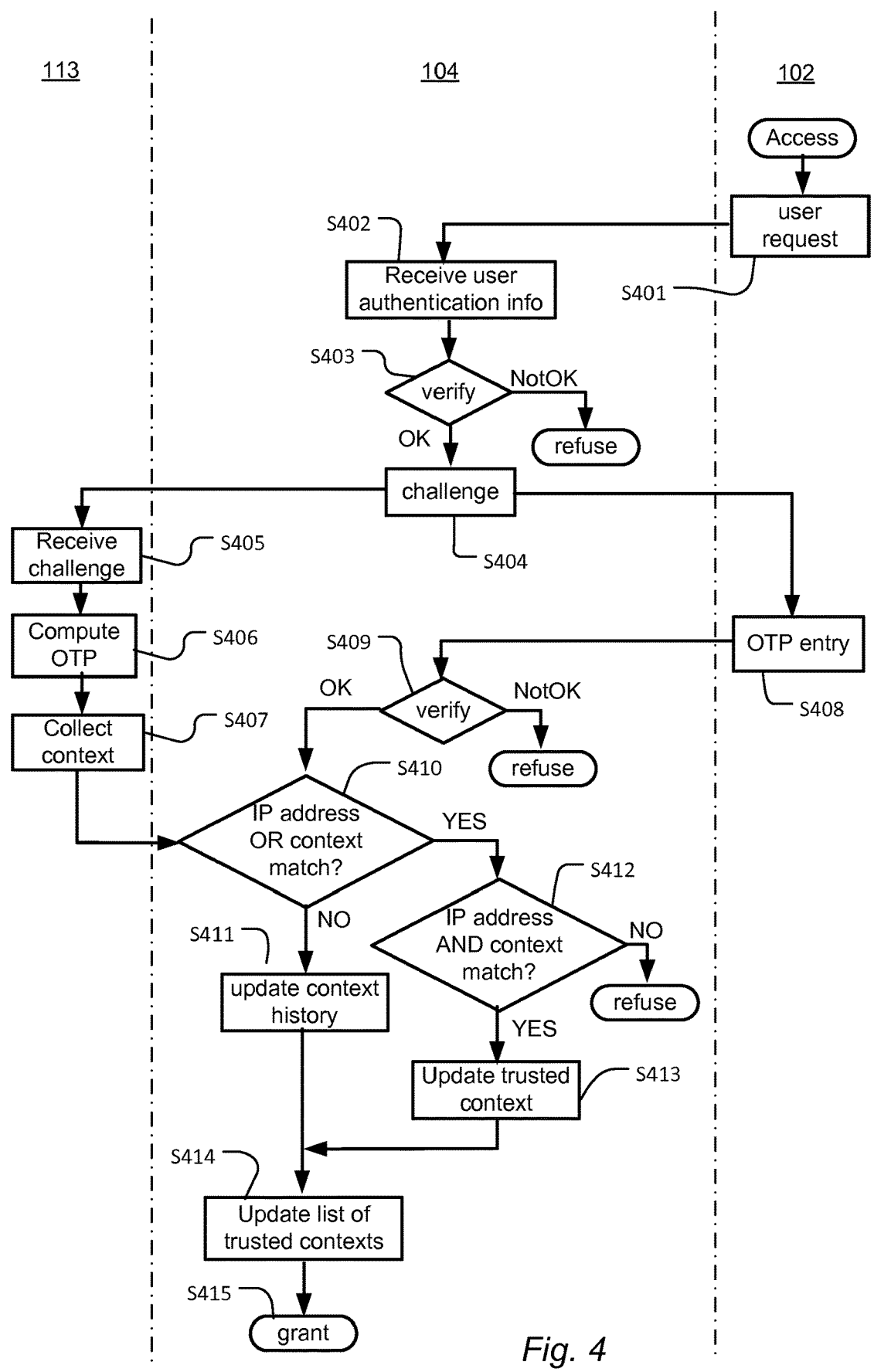
FIG. 4 shows a flow diagram of an example of an authentication process.

FIG. 4 shows a flow diagram of an example of an authentication process. The process will now be described with reference to FIG. 4 and with continued reference to FIG. 1.

The process is initiated at step S401 where a user 101 requests access to the target component 114 via a user system 102, e.g. a computer such as a PC or any other data processing system connectable to a computer network 111. The initial connection may be made directly to the authentication system 104 or via the target component 114 which routes the request to the authentication system 104. In any event, the user system 102 initially performs a login process, e.g. by executing a suitable login program on the user system 102 or by presenting a login window of a login program executed on the computer-implemented authentication system 104. Typically, the login process queries the user for a user name and a password, PIN or the like, and/or other user authentication information.

The user system 102 forwards at least a part of the user authentication information to the authentication system 104, e.g. at least a username. Hence, in step S402, the authentication system receives user authentication information from the user system. Furthermore, the authentication system 104 receives the IP address (at least its so-called public IP address) or other suitable network address of the user system.

In step S403, the authentication system verifies the user authentication information, e.g. by comparing the received username with a list, e.g. stored in database 217, of usernames of users authorised to access the target component and, optionally, by comparing the received password with a password stored in the database 217 of the authentication system. It will be appreciated that mechanisms for verifying passwords are known that avoid the need of sending the password in clear form via the computer network. Consequently, in some embodiments the user system may communicate at least some of the user authentication information, or information derived therefrom, in a form that reduces or even eliminates the risk of third parties to obtain knowledge of at least the user's password. In any event, if the verification of the user authentication information fails, the authentication system 104 refuses access and sends a failure message to the user system, and terminates the access process. Otherwise, the process proceeds at step S404.

In step S404, the authentication system 104 generates a challenge data item, e.g. a data item derived from the received user authentication information and a random number and/or a session ID. The authentication system 104 further looks up an identifier indicative of a wireless communications device 113 associated with the received user authentication information in its database 217. The identifier may be a mobile phone number. The authentication system sends the generated challenge data to the wireless communications device 113, e.g. via the message gateway 110 and the communications network 112 or via network 105. For example, the challenge data may be sent as an SMS, a pushtext message, or the like. Alternatively, the authentication system may send the challenge data to the wireless communications device via a direct data communications link, or via any other suitable communications channel. The authentication system further causes, e.g. via the target component 114, the user system 102 to display a dialog window or other suitable data entry field allowing the user 101 to enter a one-time passcode into the user system 102.

In step S405, the wireless communications device receives the challenge data, causing the wireless communications device to execute a program, e.g. an app, configured to collect contextual information. Receipt of the challenge data may cause the wireless communications device to automatically execute the program; alternatively, the wireless communications device may display the challenge data requesting the user to initiate the program, e.g. by activating a link included in the challenge data. Optionally, the wireless communications device requests additional user authentication information from the user, e.g. entering a PIN or biometric information such as a fingerprint scan, a voice sample, a picture, etc., and proceeds subject to successful verification of the additional user authentication information.

In step S406, the program executed by the wireless communications device computes a one-time passcode from the received challenge and from a shared secret stored in the wireless communications device, and displays the computed one-time passcode. Alternatively, the one-time passcode may be sent in clear form and shown directly, not using a shared secret.

On step S407, the program executed by the wireless communication device collects contextual information and sends the collected contextual information to the authentication system 104, e.g. via the communications network 112 or via network 105.

Generally, the contextual information comprises data that identifies the current environment of the wireless communications device during a login attempt from the user system. Examples of items of contextual information include: a public IP address of the wireless communications device, an SSID of the Wifi that the wireless communications device is connected to, an IP address of the access point, that the wireless communications device is connected to, a MAC address of the access point, that the wireless communications device is connected to, an IP address of the default gateway of the wireless communications device, a MAC address of the default gateway of the wireless communications device, GPS coordinates of the wireless communications device or other location information indicative of a geographic location of the wireless communications device. Alternatively or additionally, the contextual information may include data that is calculated or otherwise derived from the above information, e.g. a Geo-IP location (e.g. Country, Region and/or City) derived from the public IP address of the wireless communications device, the name of the owner of the IP address derived from the public IP address of the wireless communications device, the country, region and/or address derived from the GPS coordinates, etc. and/or combinations thereof. It will be appreciated, however, that other types of contextual information indicative of a current environment of the wireless communications device may be used.

In step S408, the user enters the one-time passcode provided by the wireless communications device into the user system 102. The user might do this manually, or alternatively the program on the wireless communication device 113 might transfer the one-time passcode automatically to the user system 102. The user system forwards the received one-time passcode to the authentication system 104 via the computer network 111.

In step S409, the computer-implemented authentication system 104 verifies the received one-time passcode. To this end, the authentication system may compute the one-time passcode from the previously sent challenge data and from a shared secret that is stored, associated with the user authentication information, in the database 217 of the authentication system. Alternatively or additionally, other authentication mechanisms may be used, e.g. a mechanism not based on challenge data and/or not based on a shared secret.

If the verification fails, the authentication system sends a failure message to the user system, and terminates the access process. Otherwise, the process proceeds at step S410.

In step S410, the authentication system determines whether the IP address of the user system received in step S402 or the contextual information received from the wireless communications device in step S407 are equal to, or match, an IP address or contextual information that was previously stored as part of a trusted security context.

Different embodiments may use different criteria for determining whether IP addresses match. In some embodiments a public IP matches another public IP, only if they are identical. In other embodiments, a public IP matches another public IP, if they are within the same subnet. In yet other embodiments, a public IP matches another public IP, if they are owned by the same organization.

Similarly, different embodiments may use different criteria for determining whether sets of contextual information match. In some embodiments, a set of contextual information matches another set of contextual information, if they contain identical data. In other embodiments, a set of contextual information matches another set, if they have a predetermined minimum degree of similarity based on a predetermined measure of similarity. The measure of similarity used may depend on the type of contextual information used. For example, for some types of information, two sets may be required to be equal, while for other types of information, certain differences may be acceptable. For example, if the contextual information comprises a geographic location (e.g. GPS coordinates), the measure of similarity between two sets of contextual information may be a geographic distance. When the contextual information comprises the set of SSIDs of all wireless networks detectable by the wireless communications device, the measure of similarity between two sets may be the number of common SSIDs, common to both sets. For example, in some embodiments, two sets of contextual information match, if they contain GPS coordinates that are within a certain predetermined range of each other. In other embodiments, a set of contextual information matches another set, if the public IP of the wireless communications device are within the same subnet or owned by the same organization. In yet other embodiments, a set of contextual information matches another set, if the set of "visible hotspots" in a vicinity of the wireless communications device match by more than ⅔.

When evaluating, whether a public IP address matches a public IP address in a list of IP addresses (e.g. a list of IP addresses of a trusted security context), the evaluation might also take all public IP addresses in the list into account. For example, in one embodiment, the public IP address is regarded as matching only if all public IP addresses in the list are owned by the same organization, and if the public IP address in question is owned by the same organization. In the same way, when evaluating, whether contextual information matches a list of sets of contextual information, the evaluation might also take all sets of the list into account.

If the authentication system recognises the IP address or the contextual information as one of a previously recorded trusted security context, the process proceeds at step S412; otherwise, the process proceeds at step S411.

In step S411, the authentication system stores, associated with the user authentication information, the IP address and the received contextual information in database 217 as part of a security context history. Alternatively, if the security context history already comprises an entry corresponding to the current IP address and contextual information, the process may update the existing entry in the security context history. For example, the process may update the existing entry by adding the date and time of the current occurrence. The process then proceeds at step S414.

The contextual information history may comprise a list of records, each record comprising the following data: one or more IP addresses, one or more items of contextual information, and an associated history log indicative of a history of occurrences of the combination of IP address and contextual information. In particular, the history log may include the date and time for each occurrence.

In some embodiments, the contextual information history is specific per user, while in other embodiments, the history is specific per "user group" (i.e. specific for respective subsets of all users) or not specific (i.e. valid for all users). For the purpose of the present example, it will be assumed that the history is specific per user.

Generally, whenever a user successfully logs into the authentication system, the user's public IP and associated context information is added to the user's security context history. In particular, if the combination of the public IP and contextual information is not already present, a new record is added. Otherwise, the existing record is updated, adding the new occurrence to the history log.

At step S412, the authentication system determines whether the IP address and the contextual information match the IP address and contextual information, respectively, of a security context that has previously (i.e. during a previous execution of step S414) been recorded as a recurring or trusted security context. If this is the case the process proceeds at step S413; otherwise, the process refuses access. In an alternative embodiment, the authentication system requests additional authentication information and grants or refuses access based on the additional authentication information. Hence, if the user requests access from an IP address that matches an IP address of a security context that has previously been identified as trusted security context, but with contextual information that does not match the previously recorded contextual information for that trusted security context, access is refused (or at least made subject to additional authentication). Similarly, if the user requests access in a context that matches contextual information of a previously determined trusted security context, but from an IP address that does not match an IP address of said trusted security context, access is also refused (or at least made subject to additional authentication).

Here, the determination as to whether IP addresses and/or contextual information match may use the same criteria as described above in connection with step S410.

Generally, the authentication system may thus maintain a list of trusted security contexts. Each entry in the list of trusted security contexts may comprise: a list of one or more IP addresses, a list of one or more sets of contextual information, each set comprising one or more items of contextual information, and a usage history of successful login attempts within this trusted security context. The usage history may comprise data about the specific combinations of IP addresses and contextual information and/or the date and time of the respective successful access attempts with the given trusted security context.

Each user may be assigned any number of trusted security contexts. Each trusted security context is typically specific per user. However, they could also be shared among subsets of users, or even all users.

Generally, whenever a user tries to log into the target system from a specific public IP address and a given contextual information (as obtained by the wireless communications device during said login), the list of trusted security contexts assigned to the user is evaluated. If any trusted security context is found, whose list of IP addresses contains an IP address matching the user's current public IP address and whose list of sets of contextual information contains a set of contextual information matching the user's current login contextual information, then access is granted. Otherwise, if a trusted security context is found, where either the list of IP addresses contains an IP address matching the user's current public IP address or where the list of sets of contextual information contains a set of contextual information matching the user's current login contextual information (but not both), then access is denied (or alternatively further authentication flow is required).

At step S413, the authentication system updates the data record indicative of the trusted security context which the current IP address and contextual information match. In particular, the authentication system updates a usage history log of the trusted security context with information about the current granted access, e.g. information about the specific combinations of IP addresses and contextual information used, and/or the date and time of the successful attempt. The process then proceeds at step S414.

In step S414, the authentication system maintains the list of trusted security contexts. In particular, the authentication system determines, based on the history of recorded security contexts, whether one or more security contexts from the history of recorded security contexts can be determined to be trusted based on the number of occurrences of that particular security context and thus be added to the list of trusted security contexts. Alternatively or additionally, the authentication system may determine whether one or more entries on the list of trusted security contexts should be regarded as being expired and thus be removed from the list of trusted security contexts.

For example, in some embodiments, whenever a new record is added to a user's security context history, or when an existing record is updated, all records in the user's security context history are processed by a policy engine implemented by the authentication system. The policy engine evaluates, based on predetermined selection criteria, whether one or more trusted security contexts can be created and added to a list of trusted security contexts associated with the user, given the current security context history.

In particular, the policy engine may receive as input the current security context history, and create as an output zero, one or more trusted security contexts to be added to the user's list of trusted security contexts, and a modified security context history, replacing the user's existing security context history. Typically, if one or more trusted security contexts are created, the resulting security context history is a reduced version of the security context history which served as an input to the policy engine.

In the following, examples of the process performed by an embodiment of a policy engine are described. However, it will be appreciated that other embodiments may implement other selection criteria for determining trusted security contexts.

In a first embodiment, the policy engine determines, based on the stored records of security contexts, whether the user has requested access to the target component from the same or a matching IP address at least a predetermined number of times within a predetermined time window. If such a recurring IP address is found, the authentication system analyses the contextual information stored in association with the IP address, from which the user has requested access at least the predetermined number of times. In particular, the authentication system determines whether one or more sets of contextual information, or at least sufficiently similar sets of contextual information, have repeatedly, e.g. a predetermined minimum number of times, occurred together with said IP address. If this is the case, the authentication system stores the determined set of contextual information and the associated IP address as a trusted security context, i.e. the authentication system stores a pair comprising an IP address and the corresponding contextual information as a recurrent or trusted security context.

In a second embodiment, the policy engine checks the history logs of all records in the security context history. If any record has a history log with more than a predetermined number of occurrences within a predetermined period of time (e.g. the previous N days), then the policy engine creates a trusted security context associated with the user, where the trusted security context comprises a single public IP address and a single set of contextual information, namely the public IP address and the contextual information from the identified record in the security context history. Then the policy engine removes the identified security context record from the user's security context history.

In a third embodiment, the policy engine checks the history log of all records in the security context history. If any record has a history log with more than a predetermined number of occurrences within a predetermined period of time, then the policy engine creates a trusted security context associated with the user, where the created trusted security context comprises a list of IP addresses ("LIST_IP") and a list of sets of contextual information ("LIST_LC") given by the closure of the public IP address ("record_PIP") and contextual information ("record_LC") from said security context history record. Here, the closure is defined as follows:

Initially, add record_PIP and record_LC to LIST_IP and LIST_LC, respectively.

Then, for any record in the user's security context history that has a public IP address matching any public IP address in LIST_IP, or a set of contextual information matching any set of contextual information in LIST_LC, add the public IP address and associated set of contextual information of this record to the LIST_IP and LIST_LC, respectively, of the trusted security context.

Repeat the previous step, until no new entries are added to LIST_IP and LIST_LC.

Remove all records from the user's security context history, from which the public IP address and contextual information were added to the trusted security context.

In the above examples, the predetermined minimum number of times and the predetermined time window may be configurable thresholds set in the authentication system. The larger the required minimum number, the higher the degree of confidence that the given context may be trusted. Similarly, the degree of similarity that is required between sets of contextual information and/or IP addresses for them to be regarded as matching or corresponding to each other may be configurable for the authentication system. The selected degree may depend on the desired level of security, on the type and number of items of contextual information, the measure of similarity employed, and/or other factors.

In the above examples, the determination as to whether IP addresses and/contextual information match may use the same criteria as described above in connection with step S410. It will be appreciated that the determination of recurring sets of contextual information or recurring security contexts may also employ more sophisticated algorithms, e.g. a clustering algorithm determining clusters of sets of contextual information, or other data analysis techniques. It will be appreciated that there may be multiple recurring security contexts.

The determination as to whether a trusted security context has expired may be based on a usage history associated with each trusted security context. To this end, whenever a user is allowed to log in due to a matching trusted security context, the usage history of the trusted security context is updated. This could just be an incremental of a counter, or it could be saving a record of the actual public IP address of the user system and associated contextual information that were used, optionally also the date and time of the actual successful login. After each successful login attempt and/or periodically and/or triggered by other events, the authentication system re-evaluates all trusted security contexts and decides whether to remove some of them as they are determined to be expired. For example, the authentication system may remove all trusted security contexts from the list that have been used less than a predetermined number of times during a predetermined time for a successful login and that were created longer than a predetermined validity period ago.

In step S415 the authentication system grants access to the target component.

It will be appreciated that, in other embodiments, various changes to the above process may be implemented. For example, step S411 may alternatively be performed as part of step S414, i.e. whenever access is granted and regardless of whether the current IP address and contextual information match a trusted security context or not. In yet another embodiment, the updating of the list of trusted security zones may be triggered by other events than a successful access. For example, the list of trusted security contexts may be updated periodically, e.g. once a day. In yet other examples, the addition of new entries to the list of trusted security contexts and the deletion of expired security contexts may be performed at different times, different frequency, or triggered by different events.

Figure 5:
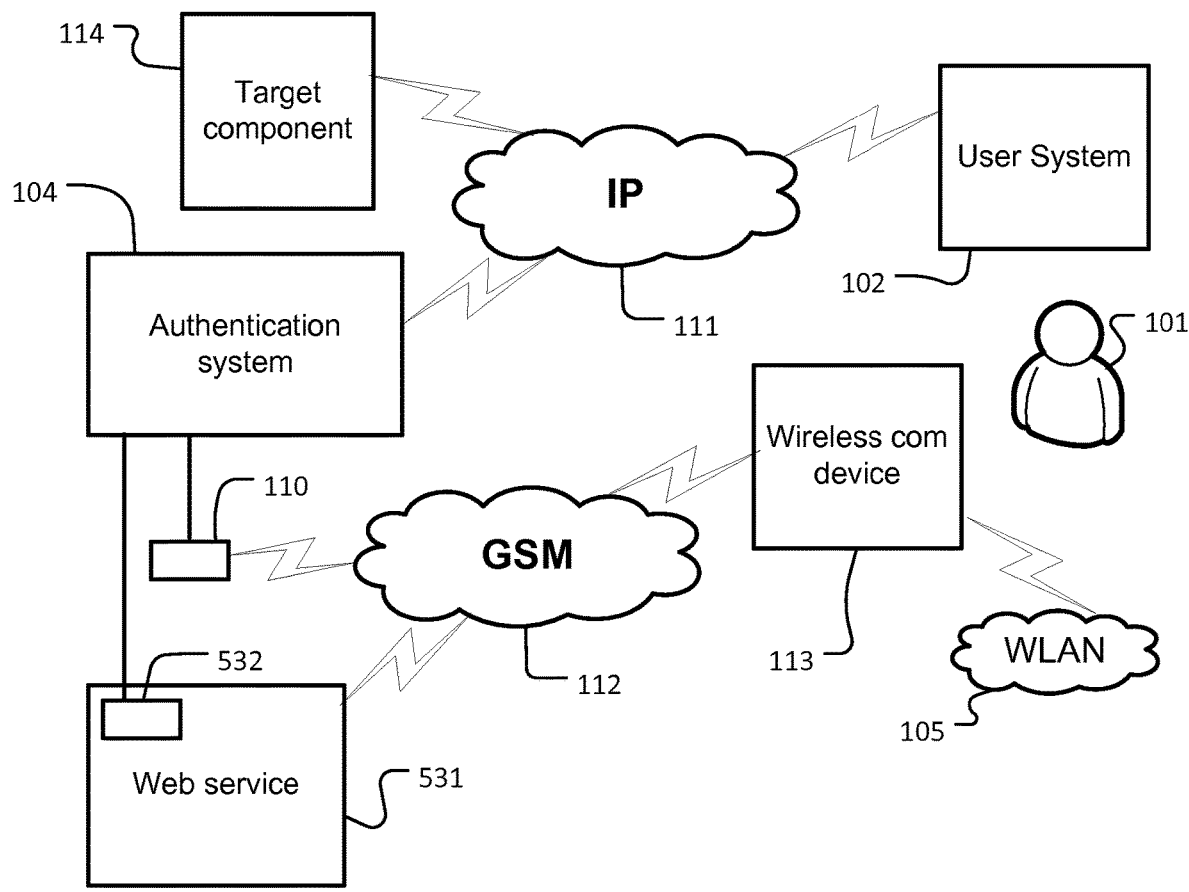
FIG. 5 schematically illustrates another example of a computer system comprising an example of an authentication system disclosed herein.

FIG. 5 schematically illustrates another example of a computer system comprising an example of an authentication system disclosed herein. The system of FIG. 5 is similar to the system described with reference to FIG. 1 and comprises a computer-implemented authentication system 104 for providing an intended authorised user 101 access to a target component 114 of a computer system while preventing access by unauthorized users. The system further comprises a user system 102 that is connectable to the authentication system via a computer network 111. The system further comprises a wireless communications device 113 that is communicatively connectable to the authentication system via a cellular telecommunications network 112 or another suitable communications network, and to a wireless local area network 105, all as described in connection with FIG. 1 above. In alternative embodiments, the wireless communications device may be connectable to one type of network only, e.g. only a wireless local area network or only to a telecommunications network. In yet alternative embodiments, the wireless communications device may be connectable to more than two networks.

In the example of FIG. 5, the wireless communications device 113 is further connectable, e.g. via communications network 112, the wireless local area network 105, or another suitable communication network, to a server 531 providing a web service or a similar service. For example, server 531 may be a mail server allowing the wireless communications device to synchronise with a mailbox of the user. To this end, the wireless communications device may execute a computer program, e.g. an app, that contacts the web service from time to time, e.g. a predetermined regular time intervals or triggered by certain events, such as a user input or action or upon connection of the wireless communications device to a WLAN access point. The computer program executed by the wireless communications device may then synchronise a local mailbox maintained by the wireless communications device with a central mailbox maintained by or otherwise accessible to the web service. An example of such a computer program executed by the wireless communications device is the synchronization app called "ActiveSync" developed by Microsoft, Inc.

The server 531 further executes an auxiliary program 532 that records the user identification of the user 101, the times of access and IP addresses from which the web service is accessed by the wireless communications device 113 of user 101. The auxiliary program 532 may further record any additional data provided through the data exchange with the app on device 113, and to be recorded as contextual information, e.g. the operating system of the wireless communications device, cookies stored on the wireless communications device, a device ID of the wireless communications device, information indicative of one or more properties of the environment of the device, and/or the like. The server 531 is communicatively connected, e.g. via a suitable computer network, to the authentication system 104, so as to allow the authentication system to retrieve the access information recorded by the auxiliary program 532. When the user 101 requests access to the target component 114 via user system 102, the authentication system 104 may thus retrieve the recorded access data from auxiliary program 532, and use the most recent IP address and, optionally, other data, recorded by the auxiliary program for the given user as contextual information in addition to or alternative to contextual information collected by the wireless communications device and forwarded by the wireless communications device to the authentication system. It will be appreciated that the authentication system may make use of the received data (IP address and contextual data) subject to certain conditions, e.g. based on the time that has elapsed since the most recent data was recorded by the auxiliary program for the given user. This embodiment thus allows collection of contextual information without the need for a specific program executed by the wireless communications device that collects contextual information. Instead, the system may rely on existing applications, such as ActiveSync that are present and executed on the wireless communications device. Consequently, the need for developing and maintaining programs for many different computing platforms of different wireless communications devices is considerably reduced. Moreover, deployment of the authentication system is simplified, since no extra application needs to be deployed to the wireless device 113 of each user.

Figure 6:
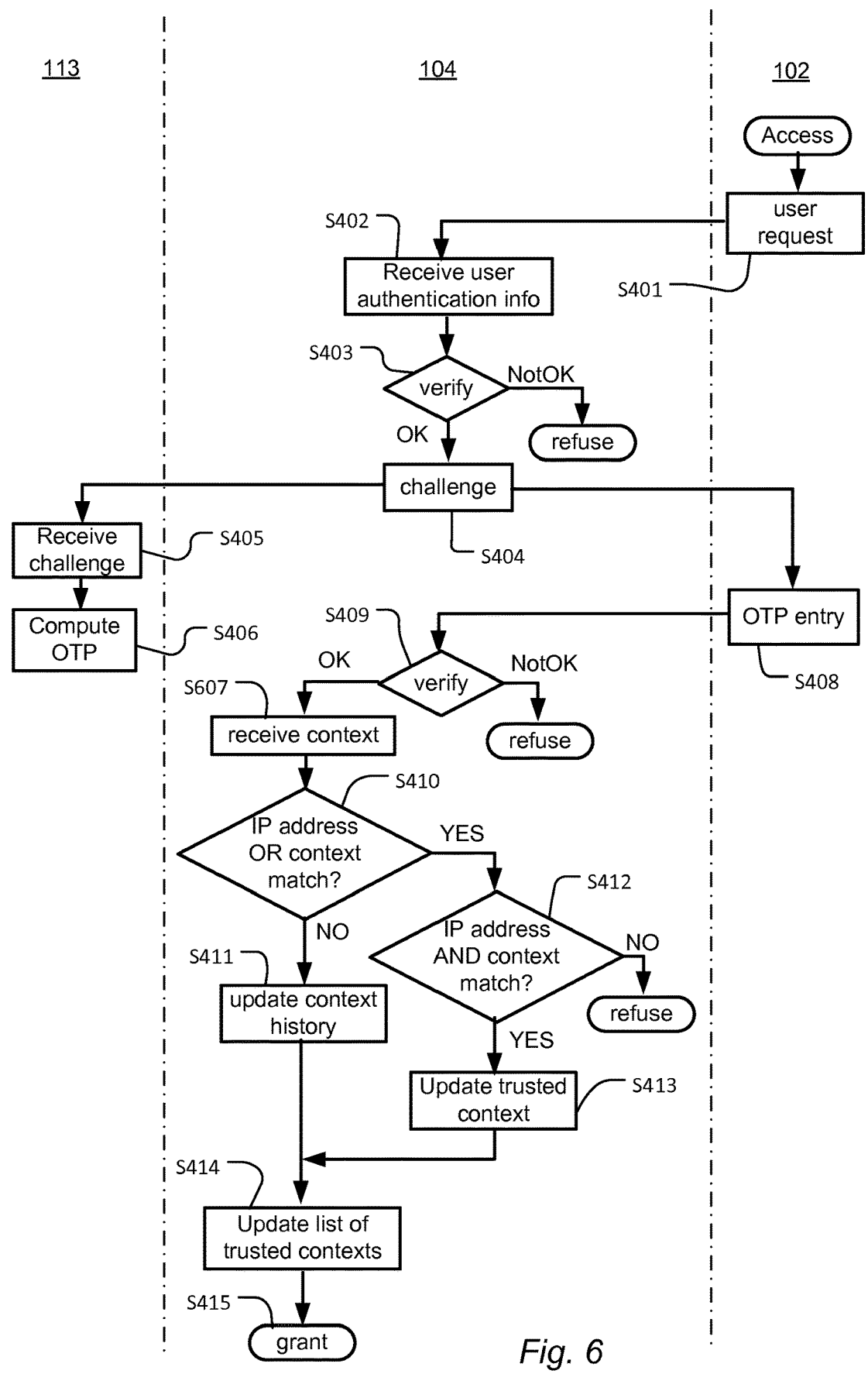
FIG. 6 shows a flow diagram of another example of an authentication process.

FIG. 6 shows a flow diagram of another example of an authentication process. The process of FIG. 6 is similar to the process of FIG. 4. However, in this example, the contextual information is collected by an auxiliary program executed by a remote server running a web service used by a program executed by the wireless communications device, e.g. as described in connection with the system of FIG. 5. Accordingly, instead of the wireless communications device collecting the contextual information, in step S407 the authentication system 104 receives the contextual information from the auxiliary program 532 running on remote server 531.

It will be appreciated that a number of variations of this embodiment are possible. For example, in the flow diagram of FIG. 6, the receipt of the contextual information from the remote server is shown conditioned upon the successful authentication of step S409. However, alternatively, the authentication system may periodically or even continuously receive such information. In such embodiments, upon receipt of a user request to access the target system, the authentication system may initially determine whether the user requests access from a trusted security context and, only if this is not the case, the authentication system initiates two-factor authentication based on an OTP. Alternatively or additionally, the authentication system may continuously monitor, even while the user is logged into the target system, whether the user is in a trusted security context. If the authentication detects that the user has left a trusted security context, the authentication system may terminate the user's session with the target system or alert the target system so as to cause the target system to terminate the session.

It will further be appreciated that, if the authentication system is not able to obtain contextual information from the wireless communications device or from the remote server (because no data is available, or because no "recent" data is available), different embodiments of the process may react in a different manner. For example, some embodiments may refuse access, while other may grant access subject to additional authentication.

Although some embodiments have been described and shown in detail, the aspects disclosed herein are not restricted to them, but may also be embodied in other ways within the scope of the subject matter defined in the following claims. In particular, it is to be understood that other embodiments may be utilized and structural and functional modifications may be made.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method, implemented by a computer-implemented authentication system, for authenticating a user attempting to access a target component of a computer system, the method comprising:

a) receiving, from a first user system via a computer network, user authentication information and a network address identifying the first user system within the computer network;

b) obtaining at least one data item of contextual information collected from a wireless communications device, the contextual information being indicative of a property of an environment of the wireless communications device associated with the user authentication information;

c) authenticating the user based on at least the user authentication information; and d) subject to successful authentication, granting the user access to the target component and maintaining a data record indicative of a stored security context comprising the received network address and the obtained contextual information collected from the wireless communications device; wherein the method further comprises:

determining, based on one or more selection criteria, at least one recurrent security context from the maintained data record, the same recurrent security context having previously occurred a number of times, the stored security context having associated with it data about one or more previous occurrences of said stored security context, wherein a previous occurrence of said stored security context refers to a successful login attempt by the user to access the target component having been made from the received network address and the associated contextual information collected from the wireless communication device matching the stored security context, wherein the recurrent security context refers to multiple previously determined occurrences of said successful login attempts, wherein the first user system is different from the wireless communications device; and using the determined recurrent security context in a subsequent decision whether to grant a subsequent request by said user to access the target component.

2. The method according to claim 1, wherein the contextual information comprises one or more of a service set identifier of a wireless local network to which the wireless communications device is connected; a service set identifier of a wireless local network detected by the wireless communications device, a network address of a node of a network to which the wireless communications device is connected, geographical coordinates of a current position of the wireless communications device; or a public internet protocol address of the wireless communications device.

3. The method according to claim 1, wherein obtaining at least one data item of contextual information comprises causing the wireless communications device to execute a software application configured to cause the wireless communications device to collect the contextual information and to forward the collected contextual information to the computer-implemented authentication system.

4. The method according to claim 1, wherein obtaining at least one data item of contextual information comprises obtaining, from a software application executed on a server computer configured to provide a service to wireless communications devices, a network address from which the wireless communications device has previously accessed said server computer to obtain said service or other data indicative of a property of the wireless communications device or at least one property of an environment of the wireless communications device.

5. The method according to claim 1, wherein authenticating the user comprises:
sending, via a communications network, challenge data to said wireless communications device;
receiving a one-time passcode; and
verifying the received one-time passcode.

6. The method according to claim 5, further comprising causing the wireless communications device to compute the passcode from at least the challenge data and a secret key of the wireless communications device.

7. The method according to claim 6, wherein verifying the received passcode comprises using the challenge data, the received passcode and a digital key stored by the computer-implemented authentication system and associated with the wireless communications device.

8. The method according to claim 5, wherein the receiving the one-time passcode includes receiving the one-time passcode from the first user system via the computer network.

9. The method according to claim 1, further comprising: if the received network address matches the network address of a previously determined recurrent security context, granting access to the target component without further authentication only if the obtained contextual information corresponds to the contextual information of said previously determined recurrent security context.

10. The method according to claim 1, further comprising: if the obtained contextual information corresponds to the contextual information of a previously determined recurrent security context, and if the received network address does not match the network address of said previously determined recurrent security context, granting access to the target component only subject to an additional user authentication process.

11. The method according to claim 1, wherein the determining is carried out after repeated successful access attempts from the received network address, and with a given recurring set of contextual information, and wherein the recurrent security context includes the received network address and the recurring contextual information which have been repeatedly associated with successful access attempts.

12. A method, implemented by a wireless communications device, for facilitating authentication of a user attempting to access a target component of a computer system, the method comprising:
receiving, from an authentication system, a request to collect contextual information indicative of a current geographical location of the wireless communication device and/or a location of the wireless communication device within a communications network environment, or data indicative of a geographical or communications network environment in which the user requests access to the target component, wherein the receiving the request includes:
receiving, from the authentication system responsive to a login session, challenge data associated with user authentication information of the user; and
computing in real-time during the login session a one-time passcode for verification by the authentication system based on at least the received challenge data and a secret key stored by the wireless communications device
causing the computed passcode to be displayed on the wireless communications device; and
executing a software application configured to cause the wireless communications device to obtain at least one data item of contextual information and to send the obtained contextual information to the authentication system.

13. The method according to claim 12, wherein the contextual information comprises one or more of a service set identifier of a wireless local network to which the wireless communications device is connected; a service set identifier of a wireless local network detected by the wireless communications device, a network address of a node of a network to which the wireless communications device is connected, geographical coordinates of a current position of the wireless communications device; or a public internet protocol address of the wireless communications device.

14. A data processing system configured to perform a method, implemented by a computer-implemented authentication system, for authenticating a user attempting to access a target component of a computer system, the method comprising:
a) receiving, from a first user system via a computer network, user authentication information and a network address identifying the first user system within the computer network;
b) obtaining at least one data item of contextual information collected from a wireless communications device, the contextual information being indicative of a property of an environment of the wireless communications device associated with the user authentication information;
c) authenticating the user based on at least the user authentication information; and
d) subject to successful authentication, granting the user access to the target component and maintaining a data record indicative of a stored security context comprising the received network address and the obtained contextual information collected from the wireless communications device; wherein the method further comprises:
determining, based on one or more selection criteria, at least one recurrent security context from the maintained data record, the same recurrent security context having previously occurred a number of times, the stored security context having associated with it data about one or more previous occurrences of said stored security context, wherein a previous occurrence of said stored security context refers to a successful login attempt by the user to access the target component having been made from the received network address and the associated contextual information collected from the wireless communication device matching the stored security context, wherein the recurrent security context refers to multiple previously determined occurrences of said successful login attempts, wherein the first user system is different from the wireless communications device; and using the determined recurrent security context in a subsequent decision whether to grant a subsequent request by said user to access the target component.

15. A wireless communications device configured to perform a method, implemented by a wireless communications device, for facilitating authentication of a user attempting to access a target component of a computer system, the method comprising:

receiving, from an authentication system, a request to collect contextual information indicative of a current geographical location of the wireless communication device and/or a location of the wireless communication device within a communications network environment, or data indicative of a geographical or communications network environment in which the user requests access to the target component, wherein the receiving the request includes:

receiving, from the authentication system responsive to a login session, challenge data associated with user authentication information of the user; and computing in real-time during the login session a one-time passcode for verification by the authentication system based on at least the received challenge data and a secret key stored by the wireless communications device causing the computed passcode to be displayed on the wireless communications device; and executing a software application configured to cause the wireless communications device to obtain at least one data item of contextual information and to send the obtained contextual information to the authentication system.

16. A computer program product comprising computer program code adapted to cause a data processing system to perform a method, implemented by a computer-implemented authentication system, for authenticating a user attempting to access a target component of a computer system, when said computer program code is executed on said data processing system, the method comprising:

a) receiving, from a first user system via a computer network, user authentication information and a network address identifying the first user system within the computer network;

b) obtaining at least one data item of contextual information collected from a wireless communications device, the contextual information being indicative of a property of an environment of the wireless communications device associated with the user authentication information;

c) authenticating the user based on at least the user authentication information; and d) subject to successful authentication, granting the user access to the target component and maintaining a data record indicative of a stored security context comprising the received network address and the obtained contextual information collected from the wireless communications device; wherein the method further comprises:

determining, based on one or more selection criteria, at least one recurrent security context from the maintained data record, the same recurrent security context having previously occurred a number of times, the stored security context having associated with it data about one or more previous occurrences of said stored security context, wherein a previous occurrence of said stored security context refers to a successful login attempt by the user to access the target component having been made from the received network address and the associated contextual information collected from the wireless communication device matching the stored security context, wherein the recurrent security context refers to multiple previously determined occurrences of said successful login attempts, wherein the first user system is different from the wireless communications device; and using the determined recurrent security context in a subsequent decision whether to grant a subsequent request by said user to access the target component.

* * * * *